United States Patent
Miyashita et al.

(10) Patent No.: US 6,904,003 B2
(45) Date of Patent: Jun. 7, 2005

(54) INFORMATION REPRODUCING APPARATUS HAVING CUE POINT SETTING FUNCTION

(75) Inventors: Masahiko Miyashita, Saitama-ken (JP); Nobuo Ohyama, Saitama-ken (JP); Takao Yamada, Saitama-ken (JP); Hiroyasu Eguchi, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 470 days.

(21) Appl. No.: 10/059,356

(22) Filed: Jan. 31, 2002

(65) Prior Publication Data

US 2002/0101790 A1 Aug. 1, 2002

(30) Foreign Application Priority Data

Jan. 31, 2001 (JP) .......................................... 2001-23814

(51) Int. Cl.[7] .............................................. G11B 17/22
(52) U.S. Cl. .................................. 369/30.07; 369/47.13
(58) Field of Search ........................... 369/30.01, 30.03, 369/30.04, 30.05, 30.06, 30.07, 30.19, 30.2, 30.27, 30.28, 47.13, 83

(56) References Cited

U.S. PATENT DOCUMENTS 5,375,106 A * 12/1994 Kawachi et al. ......... 369/30.27

FOREIGN PATENT DOCUMENTS

| JP | 6-267255 | 9/1994 |
| JP | 2000-182359 | 6/2000 |
| WO | WO 00/04726 | 1/2000 |

OTHER PUBLICATIONS

"Pioneer CDJ–500 II: Operating Instructions", Internet Article, XP002275813, pp. 1–16 (1997).

* cited by examiner

*Primary Examiner*—Paul W. Huber
(74) *Attorney, Agent, or Firm*—Arent Fox

(57) ABSTRACT

An information reproducing apparatus is provided, which has a new cue point setting function with excellent operability for enabling new application form. Specifically, a cue point for specifying a start position for playing back a disc, and additional information or disc identification information corresponding to the cue point are stored in a backup memory. The additional information or the disc identification information is associated with the cue point and shown on a display according to a proper operation of operation buttons and a turning member. When the operation buttons and the turning member are properly operated, a system controller edits and adds the additional information, or edits the disc identification information in the backup memory. When the operation buttons and the turning member are properly operated to enter retrieval information, information stored in the backup memory is compared and retrieved, and the retrieved information associated with a cue point is shown on the display.

14 Claims, 10 Drawing Sheets

ADDITIONAL INFORMATION UNDER EDITING

INFORMATION REPRODUCING APPARATUS HAVING CUE POINT SETTING FUNCTION

BACKGROUND OF THE INVENTION

1. Field of the Invention

The present invention relates to an information reproducing apparatus for reproducing information recorded on an information recording medium such as a CD (Compact Disc) and a DVD (Digital Video Disc or Digital Versatile Disc) from an arbitrary position, or repeatedly.

The present invention claims priority from Japanese Application No. 2001-023814, the disclosure of which is incorporated herein by reference for all purposes.

2. Description of the Related Art

As to conventional information reproducing apparatuses for reproducing information recorded on an information recording medium such as a CD and a DVD, apparatuses provided with a cue point setting function which quickly starts reproducing information from an arbitrary position in recorded information are known.

When a user uses the cue point setting function to set an arbitrary position in recorded information as a cue point in advance, it is possible to start reproducing from the cue point when the information recording medium is played again.

For example, when the user plays an information recording medium on which music is recorded, and sets a desired position as a cue point while listening to the music, it is possible to automatically seek and reproduce from the set cue point for the next time. Therefore, the cue point setting function provides the user with an excellent convenience.

It is just possible, however, to set an arbitrary position in information recorded on an information recording medium only as a cue point for starting reproduction (a cue point to be sought) on the conventional information reproducing apparatuses. Namely, when the user instructs to set a cue point during an actual reproduction, address information for the part currently played is stored, and thereby a seek operation of the song starting position and a play back therefrom are conducted based on the stored address information in the next reproduction.

As a result, when an user sets multiple cue points for multiple positions in recorded information, there is a problem that the user has to memorize or write down how many cue points are set or what information is recorded at the positions set as the cue points for management. However, it is usually difficult that the user memorizes complete information on positions for the cue points set on the individual information recording media. Further, when multiple cue points are set on multiple information recoding media, an annoying operation such as reproducing the recorded information again to check which cue point is set to which position is required, and thus the user cannot efficiently use the cue point setting function.

SUMMARY OF THE INVENTION

It is an objective of the present invention to provide an information reproducing apparatus for setting cue points in a new way with an excellent operability for new applications in view of the foregoing.

An information reproducing apparatus for attaining the objective of the present invention includes memory means for storing desired position information in information recorded in an information recording medium, and for storing at least additional information or identification information corresponding to the position information, and output means for providing the additional information or the identification information stored in the memory means after associating the additional information or the identification information with the position information.

The memory means stores the position information for specifying a starting position for reproducing, and the additional information or the identification information corresponding to the position information, and the output means provides the additional information or the identification information associated with the position information when an information recoding medium is played on the information reproducing apparatus with this constitution. More specifically, when cue point information is set as the position information, an indication of an existence of the set cue point is not simply shown, but the additional information or the identification information corresponding to the set cue point is shown to provide the user with understandable information relating to the position information such as a cue point.

The information reproducing apparatus according to the present invention further includes editing means for editing the additional information stored in the memory means, or adding new additional information corresponding to the position information, and editing the identification information in response to an externally provided input.

Providing the editing means for editing and adding the additional information, and editing the identification information allows associating additional information or identification information which the user desires with the position information with this constitution. Thus, this constitution realizes an application form where the user can use the additional information or the identification information suited for preference or convenience of the user to manage the information on the cue point as the position information, for example, and consequently provides excellent operability.

The information reproducing apparatus according to the present invention further includes retrieving means for retrieving the additional information or the identification information stored in the memory means in response to externally provided retrieval request information. In this constitution the retrieving means compares and retrieves position information, additional information, or identification information corresponding to the retrieval request information provided externally, associates the identification information or the additional information obtained by the comparison/retrieval with the position information, and makes the output means to provide it.

When the user enters retrieval request information, the retrieving means compares and retrieves information corresponding the retrieval request information in the memory means, and provides retrieved information associated with the position information with this constitution. Thus, the user can check position information or can play back an information recording medium from a position of a cue point set by desired position information while the user does not have to memorize the position information, and the constitution provides excellent operability.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Embodiments of the present invention will be described with reference to the accompanying drawings. An information reproducing apparatus including an editing function referred to as a synthesizer or an effector, which applies various types of signal processing to a reproduced signal to generate a sound effect when music information recorded on an information recording medium such as a CD or a DVD (simply referred to as "disc" hereinafter) is reproduced will be described as an embodiment.

Figure 1:
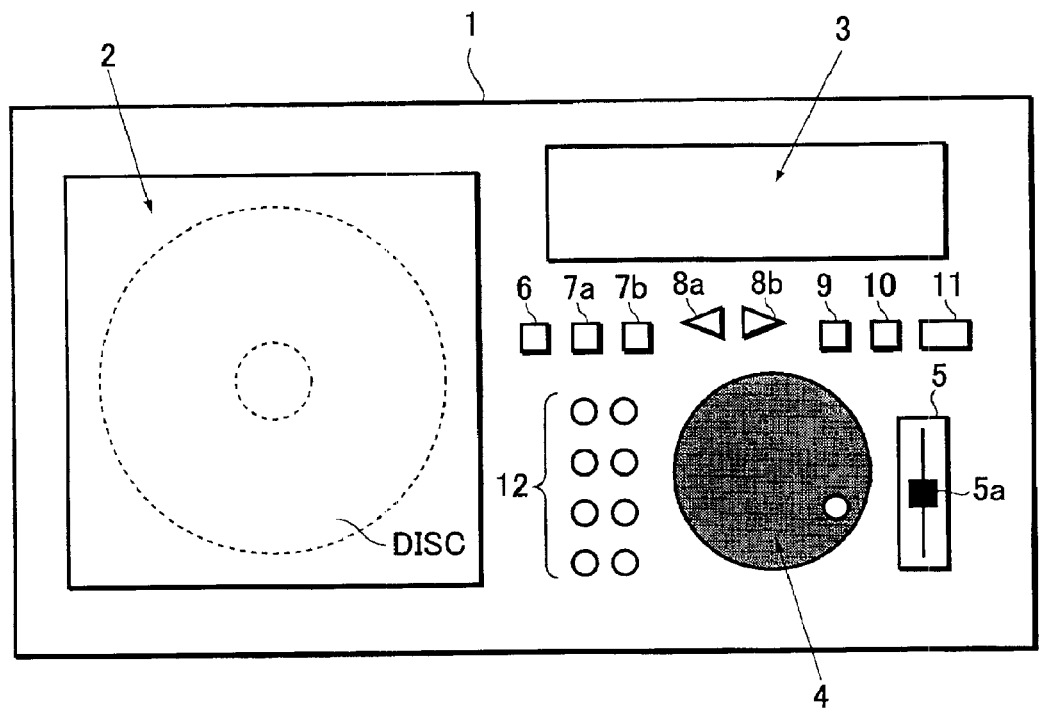
FIG. 1(a) is a plan view for showing a constitution of a panel face of an information reproducing apparatus according to the present invention.
FIG. 1(b) is an enlarged view of a display thereof.
Figure 1:
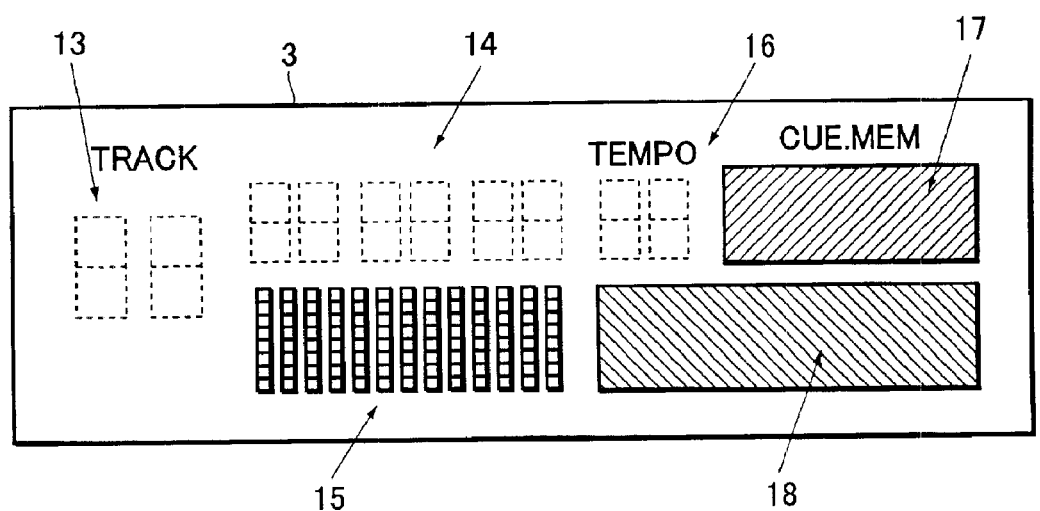

A loader 2 for detachably loading a disc such as a CD or a DVD, a display 3, a turning member 4 referred to as a jog dial, a slide-type reproduction speed adjuster 5 for variably adjusting a reproduction speed, and multiple buttons 6 to 12 are provided on an operation panel of the present information reproducing apparatus 1 as shown in a plan view of FIG. 1(a). The multiple buttons 6 to 12 are shown as an example in FIG. 1(a).

The turning member 4 is operated during editing for adding a sound effect to a signal reproduced from the disc, and editing and modifying information on a cue point (referred to as "cue point information" hereinafter) described later. Namely, the turning member 4 serves as a principal part for the present information reproducing apparatus 1 to carry out the editing function.

The following section describes typical features of the function. When a user turns the turning member 4, an encoder 27 for detecting a rotation angle shown in FIG. 2 detects a direction and an angle of the rotation of the turning member 4. Then, a system controller 26 and a servo circuit 23 move a read-out point for a signal reproduced from the disc in a direction same as that of the turning member 4 based on the detection result from the encoder 27.

The system controller 26 and a signal processor 22 combine and apply various modulations such as a frequency modulation, a phase modulation, and an amplitude modulation to the signal reproduced from the disc for generating a sound effect based on displacement quantities such as a total rotation angle (an angle between a start of a rotation and an end of the rotation), and an angular velocity (a change of an angle per unit time period) obtained from the detection result of the encoder 27. For example, when the user conducts an operation such as turning the turning member 4 fast, slow, or intermittently, the reproduced signal changes accordingly, and thus a similar sound effect can be generated as an analog record is operated to generate rap music, for example.

The reproduction speed adjuster 5 is composed of a slide-type variable resistor, and the user changes a position of a knob 5a to variably adjust a reproduction speed for reproducing a sound according to a change of a resistor value.

The operation buttons 6 to 12 are composed of push/pull-type or push-type button switches, and are used to instruct the system controller 26 for conducting basic operations such as starting, pausing, and stopping a playback of a disc, as well as setting a cue point as described later. Though a detailed description is provided later, the operation buttons 6 to 12 have the following functions.

The operation button 6 is referred to as "cue button", and a pressing operation is applied to the button to set a cue point, or to start a disc playback from a cue point set in advance.

The operation button 7a is referred to as "play button", and is provided for instructing a start of a disc playback.

The operation button 7b is referred to as "stop button", and is provided for instructing an end of a disc playback.

The operation buttons 8a and 8b are referred to as "feed button", and the user uses them to edit or modify a cue point once set, and to retrieve multiple pieces of set cue point information. When multiple cue points are set, and the user wants to retrieve multiple pieces of cue point information sequentially, the display 3 switches to show the cue point information subject to the retrieval sequentially each time when the feed button 8a or 8b is pressed. Further, the feed button 8a is used for a backward search, the feed button 8b is used for a forward search, and the user properly presses these feed buttons 8a and 8b to search for a desired cue point.

The operation button 9 is referred to as "memory button", and is pressed to store cue point information in the information reproducing apparatus 1 after the cue point information is modified.

The operation button 10 is referred to as "erase button", and is used to erase a cue point set once. Namely, the user properly presses the feed buttons 8a and 8b to retrieve desired cue point information, and then presses the erase button 10 to erase the retrieved cue point information.

The operation button 11 is referred to as "enter button", and is used to instruct to establish various input operations which the user has conducted.

The multiple operation buttons 12 are referred to as "selection button", and cue point information can be assigned to the individual selection buttons 12. Namely, when one or more cue points are set, and the individual cue point information is assigned to the individual selection buttons 12, simply pressing one of the selection buttons 12 starts a playback of a disc from a cue point assigned to the pressed selection button 12. When the feed buttons 8a and 8b are used to retrieve cue point information, and one of the multiple selection buttons 12 is pressed, the retrieved cue point information is assigned to the pressed selection button 12.

The display 3 is formed of a dot matrix type liquid crystal display, and displays a cue point which the user instructs to retrieve, cue point information which the user wants to modify or edit, and cue point information set in advance for music currently reproduced in addition to a track number on which the music currently reproduced is recorded, a spectrum of a reproduced sound, and a tempo of the reproduced sound.

More specifically, as shown in an enlarged view of FIG. 1(b), the display 3 is provided with a display area 13 for numerically showing a track number currently played, a display area 14 for showing a modulation method for generating a sound effect in characters and symbols, a spectrum display area 15 for displaying a spectrum of a reproduced sound as a bar chart, a tempo display area 16 for numerically showing a reproduction speed (tempo) of a reproduced sound, and a first display area 17 and a second display area 18 as output means for showing the cue point information.

Next, a circuit constitution of the information reproducing apparatus 1 will be described while referring to a block diagram of FIG. 2.

Figure 2:
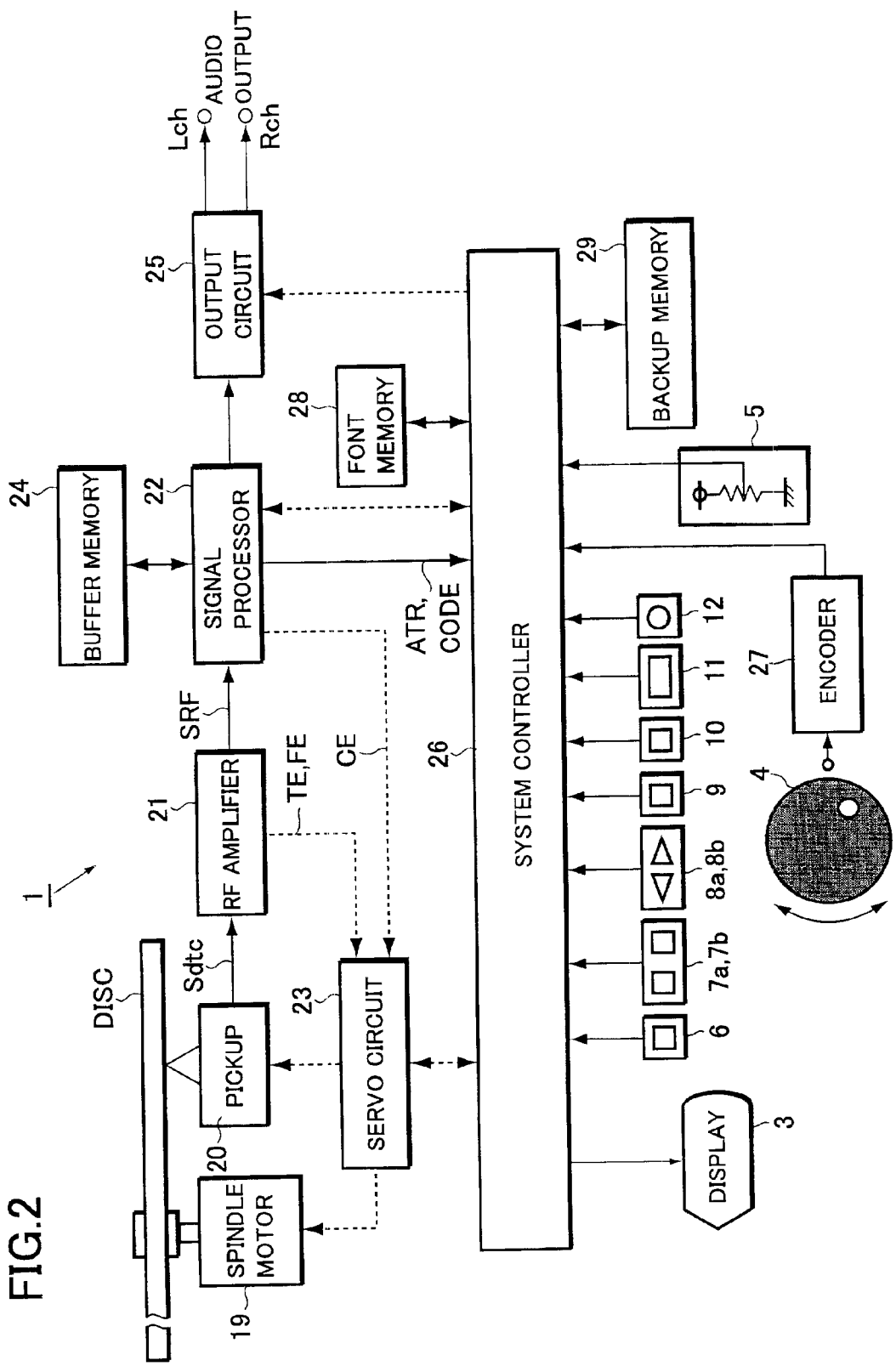
FIG. 2 is a block diagram for showing a circuit constitution of the information reproducing apparatus according to the present invention.

The information reproducing apparatus 1 is provided with a spindle motor 19, a pickup 20, an RF amplifier 21, the signal processor 22, and the servo circuit 23 as shown in FIG. 2. The spindle motor 19 rotates a disc loaded on the loader 2 at a predetermined linear velocity. The pickup 20 optically reads music information recorded on the disc, converts it into an electric signal $S_{dtc}$, and outputs the converted electric signal $S_{dtc}$. The RF amplifier 21 generates and outputs an RF signal $S_{RF}$, and error signals such as a tracking error signal TE and a focus error signal FE from the electric signal $S_{dtc}$. The signal processor 22 processes the RF signal $S_{RF}$. The servo circuit 23 carries out servo control for restraining an error in a rotational speed of the spindle motor 19, and a tracking error and a focus error of the pickup 20.

The information reproducing apparatus 1 is further provided with a buffer memory 24 for temporarily storing data during the signal processing of the signal processor 22, an output circuit 25 for converting data processed by the signal processor 22 into an analog signal with audible frequencies, and supplying an audio output for two channels comprising Lch and Rch, and the system controller 26 for centrally controlling entire operation of the information reproducing apparatus 1.

A font memory 28 for storing font data (data such as characters, symbols, and pictorial symbols) to be displayed on the display 3 in advance, and a backup memory 29 for storing the cue point information in addition to the operation buttons 6 to 12, the display 3, the reproduction speed adjuster 5, and the encoder 27 for detecting the rotation angle of the turning member 4 are connected with the system controller 26.

The signal processor 22 includes a semiconductor integrated circuit device having an arithmetic operation function such as a digital signal processor (DSP), and realizes a demodulation circuit, a stream separation circuit, and an effector circuit for applying a sound effect. When the signal processor 22 receives the RF signal $S_{RF}$ from the RF amplifier 21 during a disc playback, the signal processor 22 converts the RF signal $S_{RF}$ into digital data, the demodulation circuit conducts processing for a demodulation and an error correction compliant to a data format of the disc, and the stream separation circuit separates and extracts an audio stream. Then, the effector circuit conducts signal processing for adding an sound effect according to a change of the rotation angle of the turning member 4 and the like supplied from the system controller 26, and the processed data is provided for the output circuit 25 for generating an audio output.

The processing for the demodulation and the error correction generates a synchronization error signal CE for representing a rotational speed error of the spindle motor 19, and supplies the servo circuit 23 with the synchronization error signal CE for the servo control. Further, the separation/extraction processing extracts management data ATR and sub code data CODE recorded on the disc, and provides the system controller 26 with them.

The management data ATR include TOC information and the like recorded in a "Lead in Area" of the disc, and the system controller 26 described later extracts a disc name, an artist name, a title name (such as a song name) attached to music information, a total number of tracks on which the music information is recorded, individual track numbers, and reproduction conditions for the music information from attribute data included in the TOC information and the like supplied from the stream separation circuit.

The sub code data CODE are constituted in a predetermined frame format including a disc type, a song number and its index of recorded music, and an absolute time code for allowing the information reproducing apparatus to detect which frame of the song is currently reproduced in real time, and are recorded on the disc in advance. When the user instructs to set a cue point, the system controller 26 detects a point to which the user instructs to set the cue point from the absolute time code included in the time code sub code data CODE, and sets the cue point.

The system controller 26 is provided with a microprocessor (MPU), and executes a predetermined system program to centrally manage an entire operation of the information reproducing apparatus 1. Namely, the system controller 26 centrally manages the servo control by the servo circuit 23, the display by the display 3, the signal processing by the signal processor 22, and the like, and simultaneously controls the entire operation of the information reproducing apparatus 1 according to a desired instruction of the user provided when the user properly operates the operation buttons 6 to 12, the turning member 4, and the reproduction speed adjuster 5.

The system controller 26 extracts information such as the disc name, the artist name, the title name of the recorded music information, the total number of tracks on which the music information is recorded, the individual track numbers, and the reproduction conditions for the music information from the attribute data included in the management data ATR, and stores the extracted information as "disc identification information" in the backup memory 29.

When the user operates the cue button 6 to instruct to set a cue point, the system controller 26 extracts a position to which the user instructs to set the cue point from the sub code data CODE, and stores the extracted information as "cue position information" in the backup memory 29.

Further, the system controller 26 associates the "disc identification information" and the "cue position information", which is cue point information, with the disc, and stores it into the backup memory 29.

When the user instructs to set multiple cue points on one disc, the system controller 26 automatically extracts the "disc identification information" for the individual cue points, and multiple pieces of "cue position information", and associates them with that disc for file management.

When the user instructs to set cue points on multiple discs, the system controller 26 assigns numbers (referred as "disc identification numbers" hereinafter) to the individual discs, associate the "disc identification information" and the "cue position information" with the "disc identification numbers" for file management, thereby associating the "disc identification information"and the "cue position information" with the individual discs.

The backup memory 29 can store the "cue position information" for up to 999 cues on one or more discs, and can assign serial numbers up to 999 to the stored "cue position information" for management.

Figure 3:
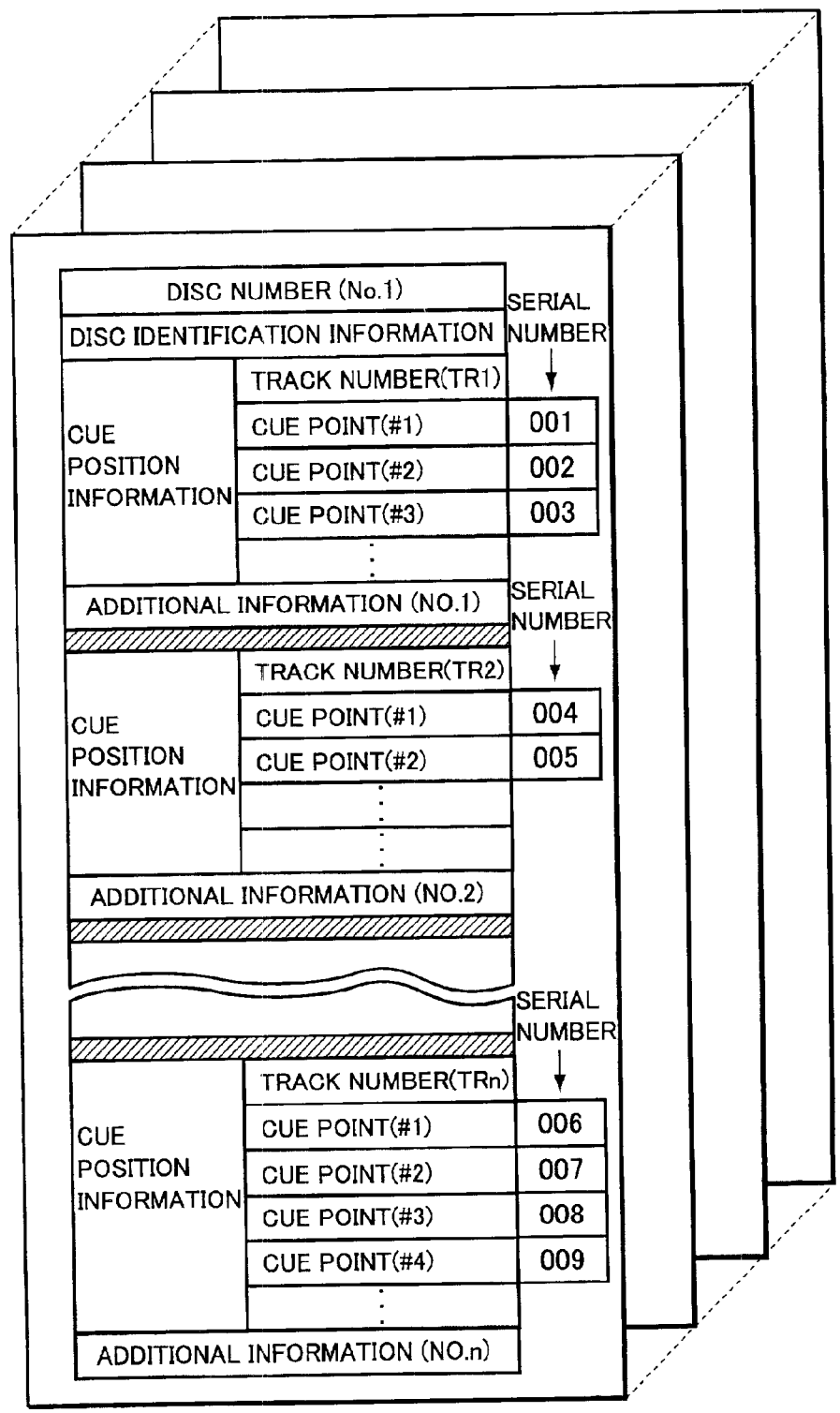
FIG. 3 is a drawing for showing a memory map of a backup memory of the information reproducing apparatus.

A "disc number", "disc identification information", and "cue position information" are stored in the backup memory 29 for one disc as shown in a memory map of FIG. 3. Further, the "cue position information" includes a track number (such as track numbers TR1, TR2, . . . ) on which setting a cue point is instructed, and time codes for indicating more detailed "cue points" on the track, numbers (#1, #2, . . . ) are added to the "cue points" within the individual track numbers, and the "cue points" are stored. In addition, serial numbers are assigned to the "cue points" continuously within the individual disc numbers for management.

Thus, when the user instructs to set multiple cue points on one disc, the backup memory 29 may store multiple pieces of "cue position information", or "cue position information" including multiple "cue points".

Figure 4:
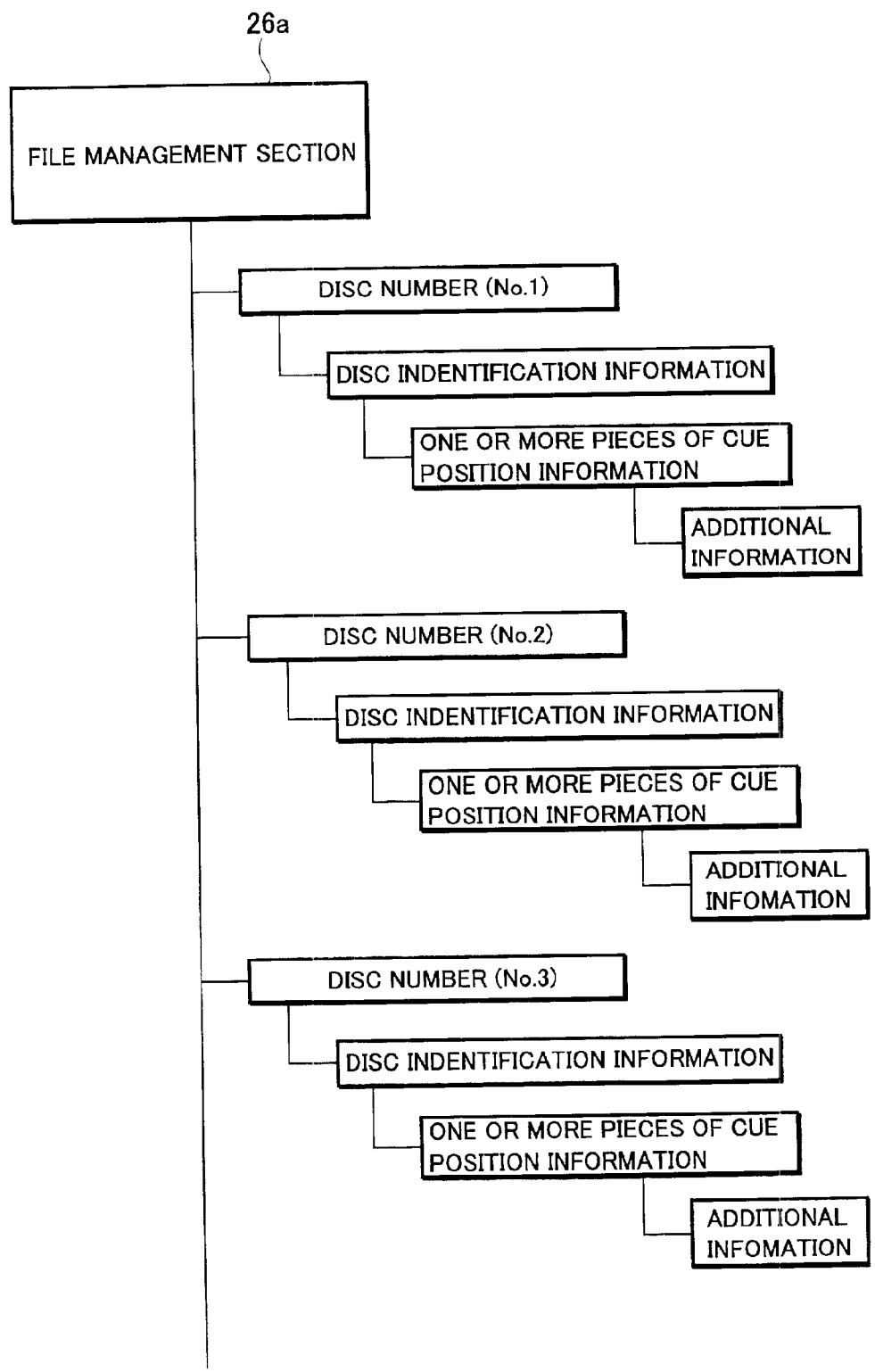
FIG. 4 is a drawing for showing a directory structure of cue point information stored in the backup memory.

When the user instructs to set cue points on multiple discs, the backup memory 29 uses a data structure same as that in FIG. 3, and stores "disc numbers", "disc identification information", and "cue position information" for the other discs, and a file management section 26a uses a predetermined directory structure to manage files as shown in FIG. 4. Firmware provided in the system controller 26 forms the file management section 26a.

When the user instructs to modify or edit a "disc number", "disc identification information", or "cue position information" already stored in the backup memory 29, the system controller 26 conducts a processing corresponding to the instruction. More detailed explanation will be described later.

Also, when the user instructs to add desired "additional information" to the "disc number", the "disc identification information", or the "cue position information" generated automatically, the system controller 26 adds the instructed "additional information", and stores it into the backup memory 29 as shown in FIG. 3 and FIG. 4. Namely, the "additional information" can be added while it is associated with a "track number", "disc identification information", or "cue point information".

When the user loads a disc again on which cue points are set on the information reproducing apparatus 1, the system controller 26 gets management data ATR of the disc, compares them with the "disc identification information" in the backup memory 29 to automatically discriminate the disc, reads in corresponding "disc identification information", "cue position information", and "additional information", displays these pieces of information on the display 3 to allow the user to easily select a desired cue point. That is, when the user operates the cue button 6 in response to the indication on the display 3, the pickup 20 automatically moves to the selected cue point for starting a reproduction based on the "cue position information" corresponding to the displayed content, and the disc playback starts from the cue point selected.

When a disc on which multiple cue points have already been set is loaded on the information reproducing apparatus 1 again, the system controller 26 sequentially reads out multiple pieces of "disc identification information", "cue position information", and "additional information" from the backup memory 29 corresponding to the present disc if the user properly operates the feed buttons 8a and 8b, and supplies the display 3 with them, and the display 3 shows them while switching the display. Thus, the user can simply see the content of a disc on which multiple cue points are set on the display 3 to easily select a desired cue point, and press the cue button 6 to instruct to start a disc playback from the cue point displayed as the result of the selection.

The following section describes contents displayed on the first display area 17 and the second display area 18 when the user properly operates the operation buttons 6 to 12 and the turning member 4 while referring to FIGS. 5(a)–5(c).

FIG. 5(a) shows a display state set as default in advance on the information reproducing apparatus 1. The first display area 17 shows one of serial numbers assigned to "cue points" stored in the backup memory 29 (see FIG. 3) in a case of this display state set as default. Namely, when the user operates the feed buttons 8a and 8b, and the selection button 12 for instructing to show desired cue point information, a serial number assigned to the instructed "cue point" is displayed on the first display area 17. For example, when the user instructs a cue point #1 on a track TR1 on a disc NO. 1 shown in FIG. 3, the first display area 17 shows a serial number "001".

A "disc number", a "track number", and a "number assigned to a cue point" corresponding to the serial number shown on the first display area 17 are read out from the backup memory 29, and are displayed on the second display area 18. For example, when a serial number "001" is shown on the first display area 17, the second display area 18 shows a number "001" corresponding to the "disc number NO. 1", a number "01" corresponding to the "track number TR1", and a number "001" corresponding to the "number assigned to the cue point #1".

Thus, when the user operates the feed buttons 8a and 8b to change a serial number shown on the first display area 17, the user can change the display of a "disc number", a "track number", and a "number assigned to a cue point" on the second display area 18, and can properly retrieve desired cue point information. Then the user loads a disc corresponding to the cue point information shown on the first and second display areas, and operates the cue button 6 or the play button 7a to play back the disc from the cue point corresponding to the indications on the first and second display areas as a seek position.

The following section describes display states shown in FIGS. 5(b) and (c). These indications are provided as options. When the user holds down both of the feed buttons 8a and 8b simultaneously for more than a predetermined time period, the user can switch the default indication in FIG. 5(a) to the optional indication in FIG. 5(b). When the user further simultaneously holds down these buttons, the user can switches from the optional indication in FIG. 5(b) to the optional indication in FIG. 5(c). When the user further holds down the feed buttons 8a and 8b simultaneously in the optional indication state in FIG. 5(c), the user can return the display to the default indication in FIG. 5(a).

The first display area 17 shows one of serial numbers assigned to "cue points" (see FIG. 3), "disc identification information" and a "number assigned to a cue point" corresponding to the serial number shown on the first display area 17 are read out from the backup memory 29, and then the second display area 18 shows them in the optional indication of FIG. 5(b).

For example, when the user uses the feed buttons 8*a* and 8*b*, and the selection button 12 for a selecting operation, and instructs to show a cue point #1 on a track TR2 on the disc NO. 1 shown in FIG. 3, the first display area 17 shows a serial number "004" as a number, and the second display area 18 shows "disc identification information" assigned to the "track number TR2", a title of a song assigned to the "track number TR2" for example, and a number "001" corresponding to "the cue point #1" on the "track number TR2".

Figure 5:
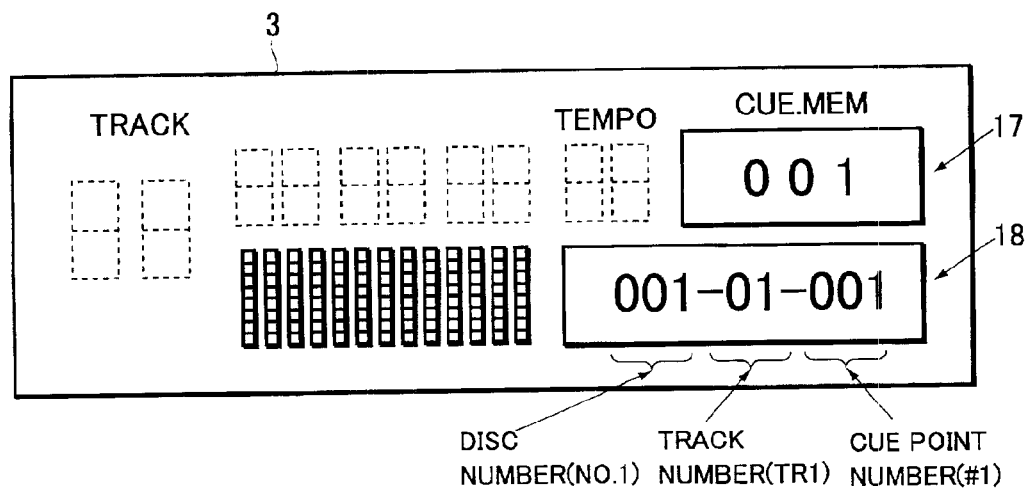
FIGS. 5(a) through 5(c) are drawings for showing display states of a display.
Figure 5:
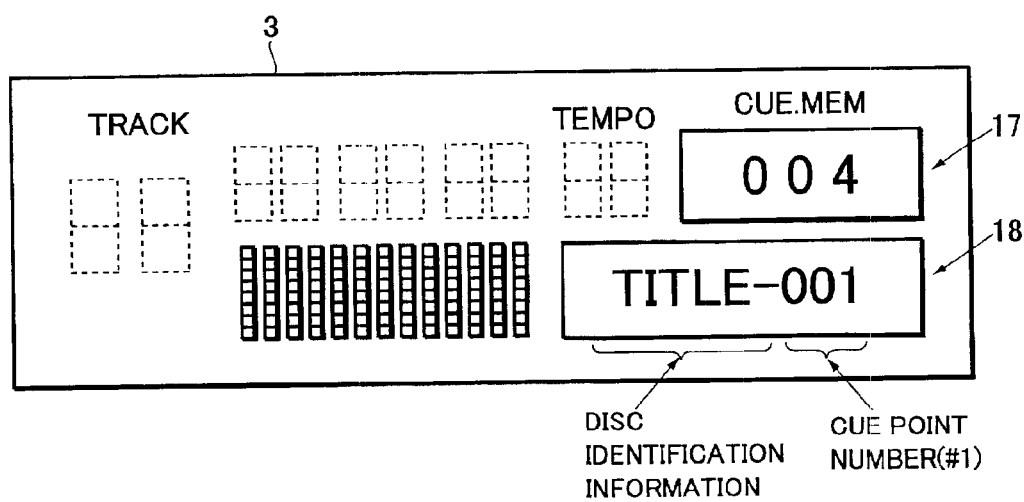
Figure 5:
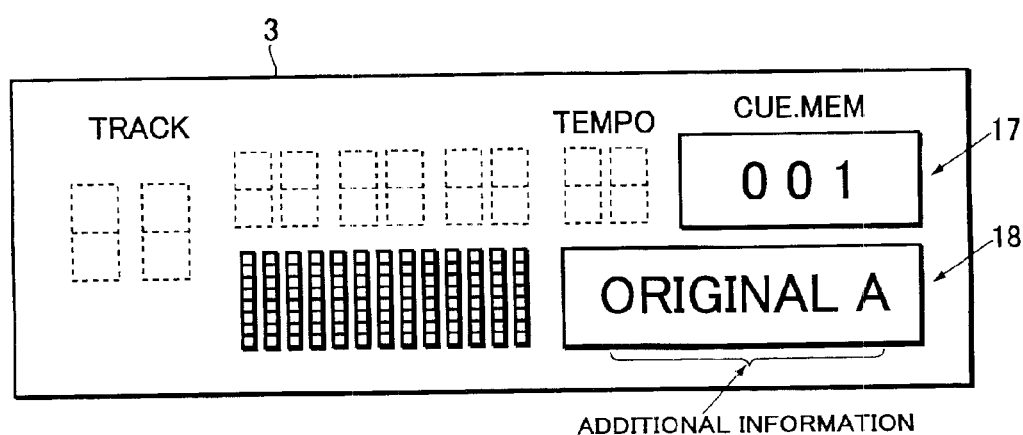

Namely, while the second display area 18 shows a "disc number" and a "track number" in the default indication of FIG. 5(*a*), a title of a song assigned to the "track number" appears instead of the "disc number" and the "track number" in the optional indication of FIG. 5(*b*). As a result, the indication can provide the user with the cue point information in an intuitively understandable state.

The first display area 17 shows one of the serial numbers assigned to "cue points" (see FIG. 3), "additional information" corresponding to the serial number shown on the first display area 17 is read out from the backup memory 29, and the second display area 18 shows it in the optional indication of FIG. 5(*c*).

Namely, when the user uses the feed buttons 8*a* and 8*b*, and the selection button 12 to conduct a selecting operation after the user has added "additional information" associated with a "disc number", "disc identification information", or "cue position information" which is already stored in the backup memory 29, the second display area 18 shows the "additional information".

For example, when the user uses the feed buttons 8*a* and 8*b*, and the selection button 12 to select a serial number "008" after the user has added "Original A" as "additional information", associated with a "cue point #3" corresponding to the serial number "008" in FIG. 3, the first display area 17 shows a number for the serial number "008", and the second display area 18 shows "Original A". When the user edits or changes once added "additional information", the "additional information" after the editing or modifying appears.

Figure 6:
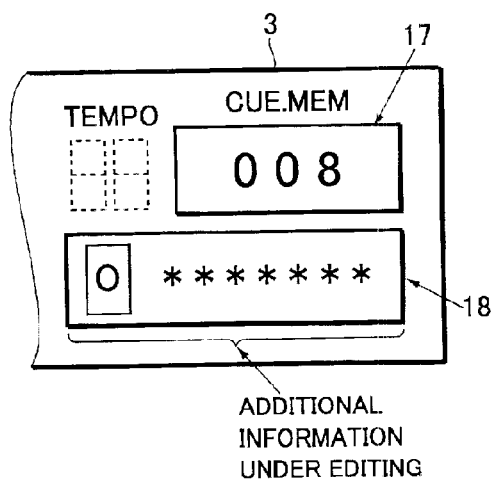
FIGS. 6(a) through 6(d) are drawings for showing display examples of the display when additional information is edited and modified.
Figure 6:
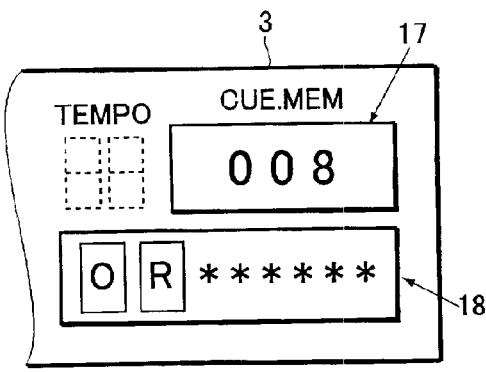
Figure 6:
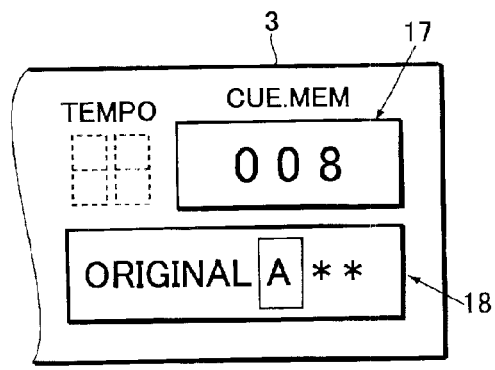
Figure 6:
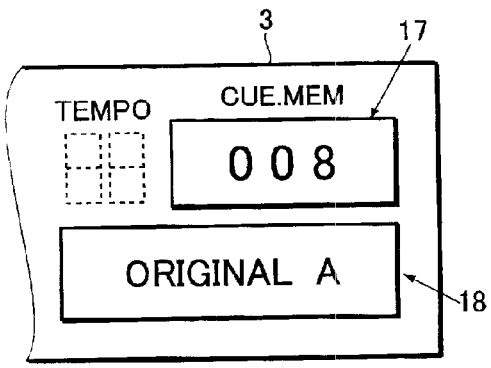

Next, the following section describes how to operate the operation buttons and indication examples on the display 3 when the user adds, edits, or modifies "additional information" with reference to FIGS. 6(*a*)–6(*d*). The description is provided while using a case where the "additional information", "Original A", is associated with the cue point #3 on a track TRn corresponding to the serial number "008" shown in FIG. 5(*c*), and is added.

When the user holds down the memory button 9 for more than a predetermined time period, the system controller 26 switches the display to an indication for adding or editing "additional information". Then, when the user properly operates the feed buttons 8*a* and 8*b*, a serial number with which the "additional information" will be associated appears on the first display area 17. Thus, when the feed buttons 8*a* and 8*b* are used to instruct to add the "additional information" to the cue point #3 on the track TRn corresponding to the serial number "008" shown in FIG., 3(*c*), the serial number "008" appears on the first display area 17 as indicated in FIG. 6(*a*).

A rectangular cursor blinks on the second display area 18. When the "additional information" corresponding to the serial number "008" is not registered in the backup memory 29, namely the "additional information" corresponding to the serial number "008" will be edited for the first time, an indication such as "*************" for showing a new editing appears.

When the user turns the turning member 4 by a predetermined angle each time, the system controller 26 reads in a font datum for a character, a symbol, or a picture pattern associated with the rotation angle from the font memory 28, and provides the display 3 with it for showing at the cursor location. Namely, when the user operates the turning member 4 to select an alphabet character "O", "O" appears at the cursor location as shown in FIG. 6(*a*).

If the user wants to enter a next character, when the user operates the feed button 8*b* once, the cursor moves right by one step, and the alphabet character "O", which is already present, continues appearing. Then, when the user operates the turning member 4 to enter the next character into the moved cursor location, and specifies, for example, an alphabet character "r", "r" appears at the cursor location.

When the user properly operated the turning member 4 and the feed button 8*b*, and has finished entering the desired string "Original A" in this way, a display appears as shown in FIG. 6(*c*).

When the user presses the memory button 9, the system controller 26 establishes the string, "Original A", as "additional information", associates it with the serial number "008", stores the "additional information" to the backup memory 29, and then shows a confirmation display as shown in FIG. 6(*d*).

As a result, the "additional information" is managed while it is associated with the cue point #3 on the track TRn corresponding to the serial number "008".

When the user properly presses the feed button 8*a* during the editing shown in FIG. 6(*a*) to FIG. 6(*d*), the user can move the cursor left. If the user uses the turning member 4 to specify another character, the user can change a character once entered.

Thus, the user can properly operate the feed buttons 8*a* and 8*b*, and the turning member 4 to edit or change "additional information" such as a desired string.

Further, when the user presses one of the multiple selection buttons 12 in the state shown in FIG. 6(*d*), the system controller 26 associates the pressed selection button with the "additional information", the serial number "008", and the cue point #3 on the track number TRn, and manages them.

After the user presses the memory button 9, and instructs to establish the "additional information", if the user wants to change the "additional information" again, the user can presses the memory button 9 again to show the already stored "additional information" on the second display area 18. Namely, the already stored string, "Original A", appears on the second display area 18 in the example described above. Then, the user operates the feed buttons 8*a* and 8*b* to properly move the cursor position, and properly operates the turning member 4 to make the desired change. For example, when the user moves the cursor to the character "A" in the string "Original A", properly turns the turning member 4 to enter a character "B", and presses the memory button 9 finally, the user can change the string to "Original B".

Though the above section describes a case where the "additional information" is added while it is associated with the serial number "008", the similar operation can add or change "additional information" while it is associated with a "disc number", "disc identification information" or "cue position information".

Next, an operation of the information reproducing apparatus 1 including the above mentioned constitution will be described with reference to the flowcharts in FIG. 7 to FIG. 11. Because the present information reproducing apparatus 1 allows the user to operate the operation buttons 6 to 12, and the turning member 4 while combining them in various ways, the following section describes typical operations according to application forms of users.

Figure 7:
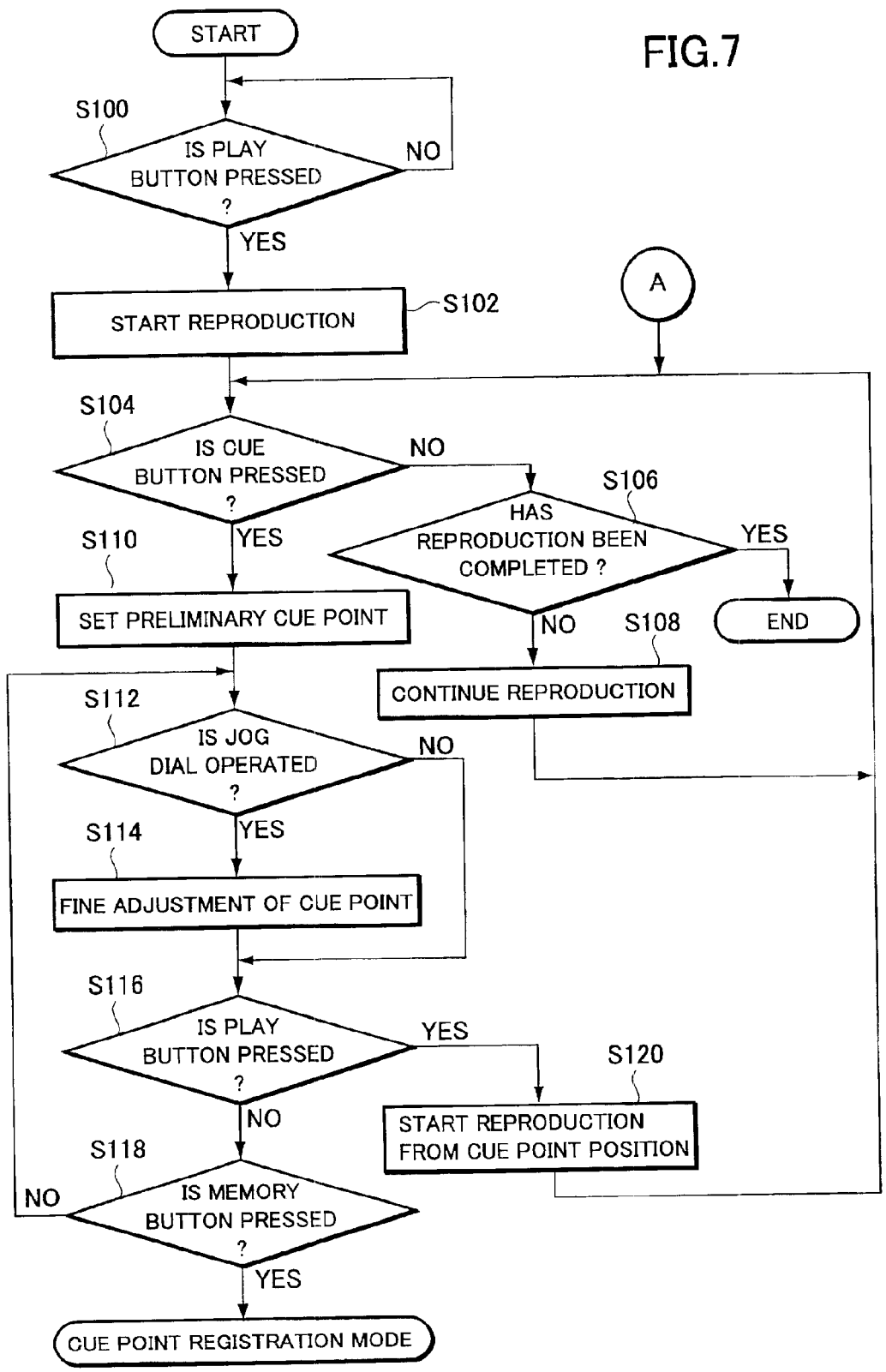
FIG. 7 is a flowchart for showing an operation of the information reproducing apparatus according to the present invention.
Figure 8:
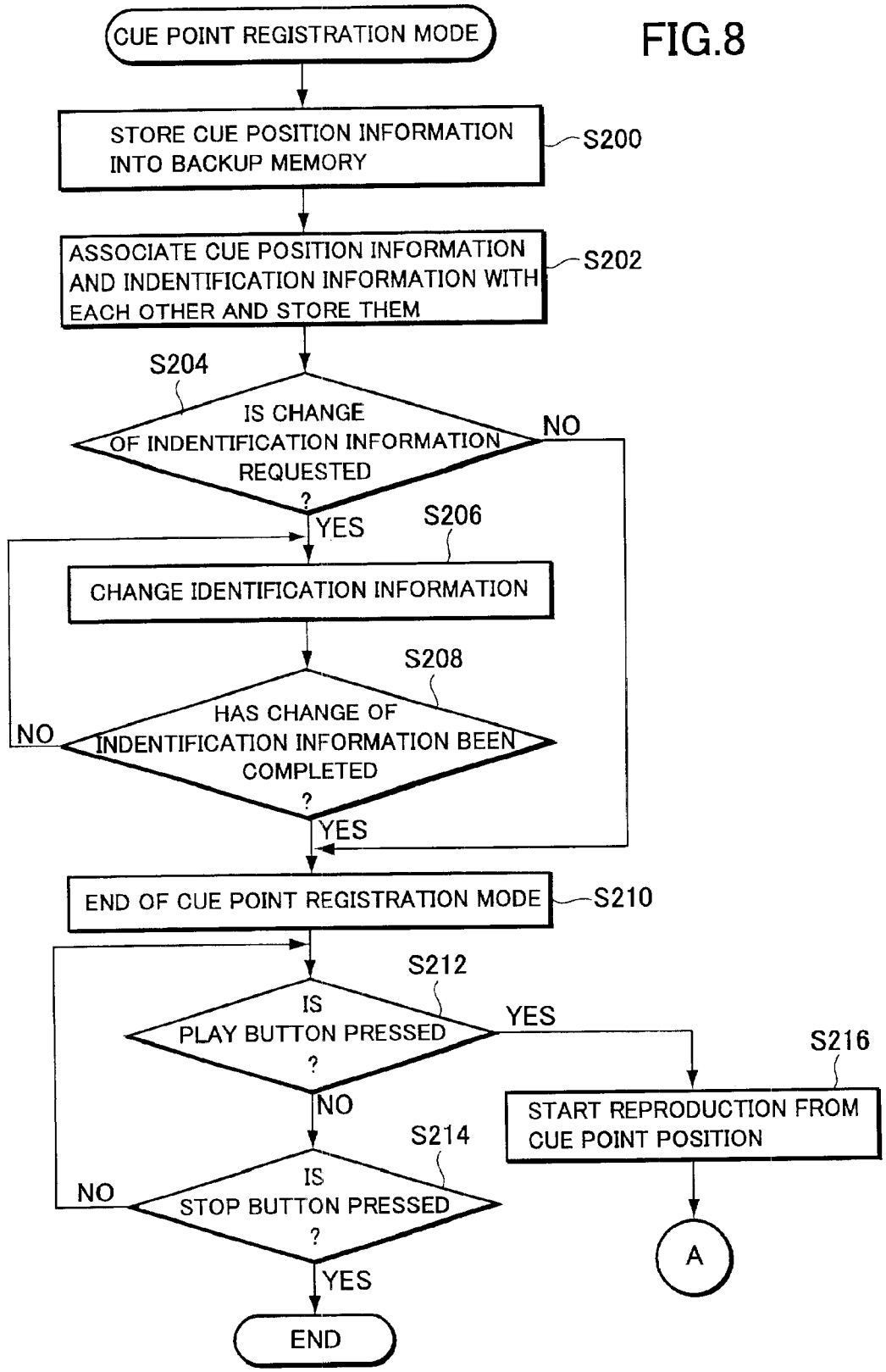
FIG. 8 is a flowchart for showing another operation of the information reproducing apparatus according to the present invention.

FIG. 7 and FIG. 8 show an operation for setting a cue point.

When the user loads a desired disc, the system controller 26 reproduces and obtains management data ATR recorded in a lead in area, and checks the management data ATR against data stored in the backup memory 29 for discriminating the disc in FIG. 7.

Then, in step S100, if the play button 7*a* is pressed during a temporary wait state for a predetermined time period or the predetermined time period has passed, this procedure proceeds to step S102, and a reproduction of recorded music information starts.

The procedure keeps checking whether the cue button 6 is pressed while reproducing the music in Step S104. If the cue button 6 is not pressed, the procedure proceeds to step S106, and it is determined if reproduction of the entire music information has been completed. If the reproduction has been completed, the reproduction operation finishes.

When the reproduction has not been completed, the reproduction operation continues in step S108, and the processing from step S104 continues.

When it is determined that the cue button 6 is pressed in step S104, a time code when the cue button 6 is pressed is obtained from sub code data CODE in step S110. Preliminary cue point information including "disc identification information", a "track number", a "cue point", and the like is generated from the time code and the management data ATR as shown in FIG. 3, and is temporarily stored in a predetermined buffer register in the system controller 26. Then, the preliminary cue point information is shown in the first display area 17 and the second display area 18 on the display 3.

Then, it is checked whether the turning member 4 is operated in step S112. If the turning member 4 is operated, the "cue point" is finely adjusted in the preliminary cue point information according to a rotation angle thereof, and the finally adjusted "cue point" updates the preliminary cue point information.

Namely, if the user presses the cue button 6 in step S104, and cannot set a desired cue point due to a missed pressing timing, the user can make a fine adjustment in step S114. Then, the procedure proceeds to step S116. Here, when the turning member 4 is not operated, the procedure proceeds to step S116 without processing in step S114.

Then, it is determined whether the play button 7*a* is pressed in step S116. If the play button 7*a* is pressed, the procedure proceeds to step S120, where the preliminary cue point information is stored in the backup memory 29 as established "cue point information". Then, a reproduction from the "cue point" starts, and after that, the process from step S104 continues. Namely, the user can press the play button 7*a* to check whether the cue point is correctly set or not.

If the play button 7*a* is not pressed in step S116, it is determined whether the memory button 9 is pressed in the next step S118. If the memory button 9 is not pressed, the processing from step S104 is repeated. If the memory button 9 is pressed, the procedure proceeds to processing, "cue point registration mode", shown in FIG. 8.

The "cue point registration mode" is a mode for registering "cue point information" in more diverse forms than the case where the play button 7*a* is pressed in step S116, and thereby preliminary cue point information is stored in the backup memory 29 as established "cue point information" in step S120.

When the procedure proceeds to the "cue point registration mode", the preliminary cue point information is stored in the backup memory 29 as established "cue point information" in step S200 in FIG. 8.

In step S202, "cue position information" and the "disc identification information" are associated with each other, and are stored.

Next, it is determined whether a change of a "disc name" included in the "disc identification information" is requested in step S204. If the memory button 9 is pressed, it is determined that the change of the disc name is requested, and then the procedure proceeds to step S206.

The "disc name" in the "disc identification information" is shown in the second display area 18 on the display 3 in step S206. If the "disc identification information" does not include "disc name" information, an indication of "No disc name" is shown.

When the user conducts a similar operation as described while referring to FIGS. 5(*a*)–5(*c*), and instructs to change or modify the "disc name", or the user enters a "disc name" in response to the indication of "No disc name", the system controller 26 generates a new "disc name" accordingly, and the procedure proceeds to step S208.

If the user presses the memory button 9 to establish the "disc name" in step S208, the new "disc name" replaces the "disc name" before the change, and is stored in the backup memory 29, and the "cue point registration mode" ends in step S210.

When the change of the identification information is not requested in step S204, the "cue point registration mode" ends immediately. If the completion of the change of the identification information is not instructed in step S208, the processing from step S206 is repeated to allow the user to change or modify the "disc name" until the user is satisfied.

Then, it is determined whether the play button 7*a* is pressed in step S212. If the play button 7*a* is not pressed, the procedure proceeds to step S214, and determines whether the stop button 6 is pressed. If the stop button 6 is not pressed, the processing from step S212 is repeated. If the stop button 6 is pressed, the disc playback ends.

When the play button 7*a* is pressed in step S212, the procedure proceeds to step S216, and a reproduction starts from the "cue point" set in the "cue point registering mode", and the procedure continues the processing from step S104 in FIG. 7. Namely, continuing the processing from step S104 in FIG. 7 allows the user to set a next cue point.

Next, an operation for retrieving and erasing the "cue point information" already set will be described with reference to the flowchart in FIG. 9.

Figure 9:
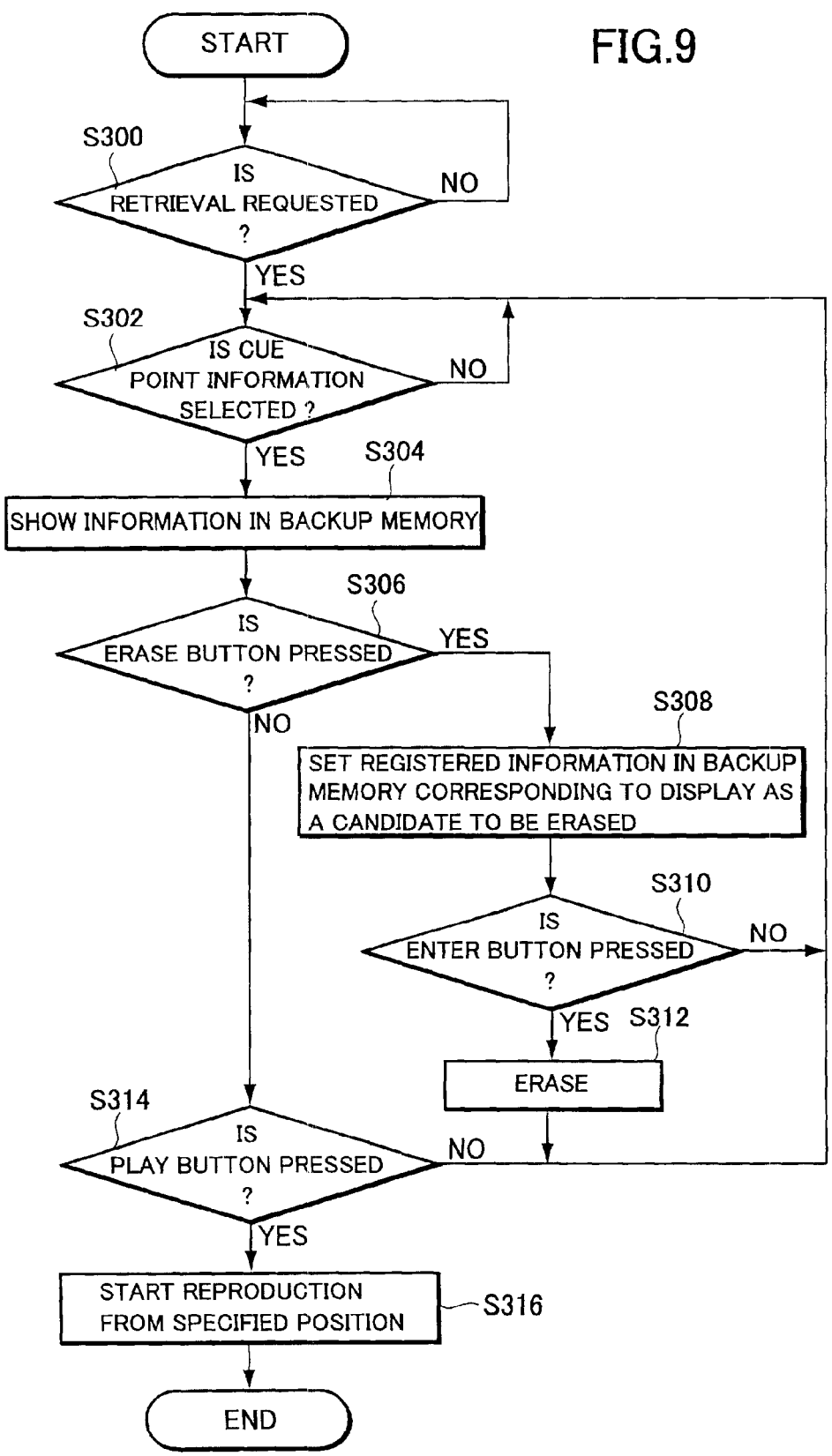
FIG. 9 is a flowchart for showing a retrieval operation of the information reproducing apparatus according to the present invention.

This retrieval is available whether a disc is loaded or not in FIG. 9.

It is determined whether the cue button 6 and the enter button 11 are simultaneously pressed in step S300, and determined that a retrieval request is made if they are pressed. Then, the procedure proceeds to step S302.

It is determined whether the user uses the feed buttons 8*a* and 8*b* to select and specify desired "cue point information" in step S302. If the user selects and specifies the "cue point information", the procedure proceeds to step S304, and the "cue point information" from the backup memory 29 is shown in the first and second display areas of the display 3.

Namely, when the user properly presses the feed buttons 8*a* and 8*b* to specify the serial number shown in FIG. 3, the serial number appears on the first display area 17 as a number, and the "disc number", the "disc identification information", and the "cue point" corresponding to the specified serial number appear on the second display area 18 as shown in FIG. 5(*a*). When the user has previously switched to the optional indication, a display appears as shown in FIG. 5(*b*) or FIG. 5(*c*).

The procedure pauses for a predetermined time period in step S306, and it is determined whether the erase button 10 is pressed during this period. If the erase button 10 is pressed, the procedure proceeds to step S308, sets registered information (cue point information) in the backup memory 29 corresponding to the displayed content as a candidate to be erased, and shows so. The procedure pauses for a predetermined time period in step S310. If the enter button 11 is pressed during this wait period, after the instructed "cue point information" is erased from the backup memory 29 in step S312, the procedure proceeds to step S302. When the predetermined time period passes while the enter button 11 is not being pressed, it is determined not to erase the candidate "cue point information" to be erased. An indication of non-erasing is shown, and the procedure proceeds to step S302.

When the erase button 10 is not pressed in step S306, the procedure proceeds to step S314. It is determined if the play button 6 is pressed. If the play button 6 is pressed, it starts reproducing a disc with the "cue point" in the "cue point information" specified in step S302 as a seek position. When a disc is not loaded, the user presses the play button 6 after the user loads a disc to be searched. When the user has already loaded a disc, it is determined whether a disc to be searched is loaded based on the management data ATR recorded in the lead in area. If the disc is proper, reproducing the disc with the "cue point" as a seek position is started.

Figure 10:
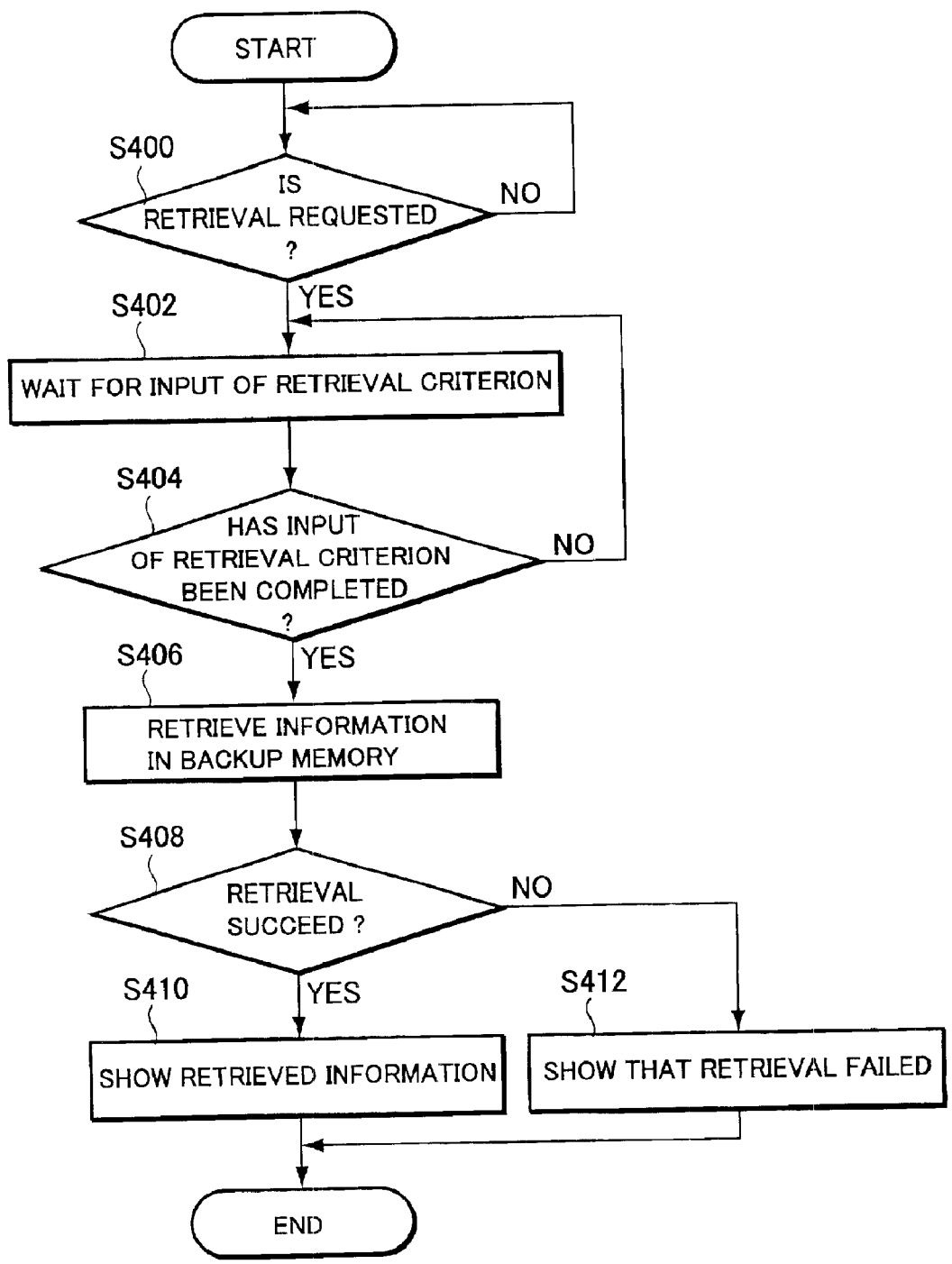
FIG. 10 is a flowchart for another retrieval operation of the information reproducing apparatus according to the present invention.

Next, the following section describes another operation for retrieving already set "cue point information" with reference to the flowchart in FIG. 10.

While the retrieval method described with reference to FIG. 9 is to retrieve "cue point information" for individual serial numbers, a retrieval method in FIG. 10 is to directly enter a content of a "track number" or "disc identification information" for a retrieval.

In step S400 of FIG. 10, it is determined whether the cue button 6 and the enter button 11 are pressed simultaneously. When they are pressed simultaneously, it is determined that a retrieval request is made, and the procedure proceeds to step S402.

In step S402, a subject to be retrieved is selected in the same way as in step S302 of FIG. 9. If the user uses the turning member 4 to enter a desired string, the string is shown on the second display area 18 of the display 3. If the enter button 11 is pressed in the next step S404, it is determined that the entered string is a retrieval criterion, and the procedure proceeds to step S406.

It is determined whether "cue point information" matching the retrieval criterion exists (is registered) in the backup memory 29 in step S406. It is not checked whether the string entered as the retrieval criterion exactly matches data in the backup memory 29, but the retrieval is conducted under a relatively loose condition. Then, the "cue point information" with the most exact match is retrieved and displayed. This largely decreases a load of the retrieval on the user.

It is determined whether the "cue point information" to be retrieved has been found in step S408. If the retrieval was successful, the retrieved "cue point information" is displayed in step S410, and the retrieval ends. If the retrieval was not successful, the procedure proceeds to step S412, and shows that the retrieval was not successful, and the retrieval ends.

If the "cue point information" to be retrieved is found in step S408, and the user presses the play button 7*a* while the retrieved "cue point information" is being shown in step S410, a reproduction starts with the "cue point" in the retrieved "cue point information" as a seek position.

Because the information reproducing apparatus 1 of the present invention stores "disc identification information" and/or "additional information" in the backup memory 29, and shows the "disc identification information" and/or the "additional information" on the display 3 for providing the user with a cue point position and the like in an easily understandable way, the information reproducing apparatus 1 can provide excellent operability when the user specifies a cue point to play back a disc.

Especially when the user uses the present information reproducing apparatus 1 including an edit function referred to as an effector, and adds a sound effect to a reproduced sound to generate a rap music with a fast tempo, while reproducing from different cue points, or repeating reproduction, for example, because the user can easily determine cue point positions, the user fully utilizes advanced techniques to generate music. Namely, because the user can use the cue point setting function described in the present embodiment to efficiently use the edit function referred to as an effector, the information reproducing apparatus 1 can greatly contribute to generating excellent music.

Because the editing means realized by elements such as the operation buttons 6 to 12, the turning member 4, the system controller 26, the backup memory 29, and the display 3 enables editing and adding additional information, and editing disc identification information, the information reproducing apparatus 1 enables an application form where the user can use additional information and disc identification information suited for the user's preference and convenience to manage cue points, for example, and consequently provides excellent operability.

Because the retrieving means realized by elements such as the operation buttons 6 to 12, the turning member 4, the system controller 26, the backup memory 29, and the display 3 enables retrieving information stored in the backup memory 29, the information reproducing apparatus 1 provides excellent operability such as checking cue points, and easily setting a disc playback from a desired cue point.

Though the display device such as a liquid crystal display is exemplified as output means for the cue point information in the present embodiment, it is also possible to convert the cue point information into sound to provide externally from a speaker or the like.

While the present embodiment uses an optical disc such as a CD or a DVD as an information recording medium to be reproduced, a portable (removable) information recording medium comprising a semiconductor memory is also applicable. Namely, the information reproducing apparatus 1 may be provided with a memory slot for detachably storing an information recording medium composed of a semiconductor memory, and the system controller 26 shown in FIG. 2 has access to information recorded in a recording area of the information recording medium, and supplies the signal processor 22 with the read out information (reproduced information). This constitution enables setting a start position for reproducing from a specified position or repeating reproduction for information read from the information recording medium composed of a semiconductor memory just as supplying the signal processor 22 with the signal $S_{RF}$ reproduced from an optical disc such as a CD or a DVD.

The information recording media to be reproduced by the information reproducing apparatus of the present invention are not limited to optical discs such as a CD or a DVD, or information recording media composed of a semiconductor memory, but various different types of information recording media are applicable.

As described above, when the information recording medium is played back with the information reproducing apparatus of the present invention, the position information for specifying a start position for reproduction, and additional information or identification information corresponding to the position information is stored in the memory means, and the output means provides the additional information or the identification information associated with the position information. In a more specific example, when cue point information is set as the position information, additional information or identification information corresponding to the set cue point can be provided as a display instead of a simple display for indicating the existence of the set cue point. Thus, information relating to a position such as a cue point can be presented to the user in an easily understandable way, and excellent operability is provided.

When the user enters retrieval request information from outside, the retrieving means compares and retrieves information from the memory means corresponding to the retrieval request information, and provides the retrieved information associated with position information. Thus, even if the user does not record the position information manually, for example, he/she can check the position information, or play back the information recording medium from a cue point set by desired position information, and excellent operability is provided.

Because information corresponding to retrieval request information input from outside is compared and retrieved from the memory means, and the retrieved information associated with a cue point is shown on the display, excellent operability such as checking a cue point, or easily setting a disc playback from a desired cue point is provided.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information reproducing apparatus comprising:
   memory means for storing desired position information and identification information extracted from information recorded in an information recording medium, and for storing additional information corresponding to said position information; and
   output means for providing said additional information or said identification information stored in said memory means after associating said additional information or said identification information with said position information.

2. The information reproducing apparatus according to claim 1, further comprising editing means for editing said additional information stored in said memory means, or adding new additional information corresponding to said position information, and editing said identification information in response to an externally provided input.

3. The information reproducing apparatus according to claim 1, further comprising retrieving means for retrieving said additional information or said identification information stored in said memory means in response to externally provided retrieval request information, wherein said retrieving means compares and retrieves position information, additional information, or identification information corresponding to said retrieval request information provided externally, associates the identification information or the additional information obtained by the comparison/retrieval with the position information, and allows said output means to provide it.

4. The information reproducing apparatus according to claim 2, further comprising retrieving means for retrieving said additional information or said identification information stored in said memory means in response to externally provided retrieval request information, wherein said retrieving means compares retrieves position information, additional information, or identification information corresponding to said retrieval request information provided externally, associates the identification information or the additional information obtained by the comparison/retrieval with the position information, and allows said output means to provide it.

5. An information reproducing apparatus comprising:
   a backup memory for storing desired position information and identification information extracted from information recorded in an information recording medium, and for storing additional information corresponding to said position information; and
   a display for providing said additional information or said identification information stored in said backup memory after associating said additional information or said identification information with said position information.

6. The information reproducing apparatus according to claim 5, further comprising an editing section for editing said additional information stored in said backup memory, or adding new additional information corresponding to said position information, and editing said identification information in response to an externally provided input.

7. The information reproducing apparatus according to claim 5, further comprising a retrieving section for retrieving said additional information or said identification information stored in said backup memory in response to externally provided retrieval request information, wherein said retrieving section compares and retrieves position information, additional information, or identification information corresponding to said retrieval request information provided externally, associates the identification information or the additional information obtained by the comparison/retrieval with the position information, and allows said display to provide it.

8. The information reproducing apparatus according to claim 6, further comprising a retrieving section for retrieving said additional information or said identification information stored in said backup memory in response to externally provided retrieval request information, wherein said retrieving section compares and retrieves position information, additional information, or identification information corresponding to said retrieval request information provided externally, associates the identification information or the additional information obtained by the comparison/retrieval with the position information, and allows said display to provide it.

9. The information reproducing apparatus according to claim 1, further comprising control means for controlling to reproduce the information recorded in the information recording medium from a specified position based on any one of selected or retrieved position information, or any one of position information selected or retrieved from said additional information or identification information.

10. The information reproducing apparatus according to claim 2, further comprising control means for controlling to reproduce the information recorded in the information recording medium from a specified position based on any one of selected or retrieved position information, or any one of position information selected or retrieved from said additional information or identification information.

11. The information reproducing apparatus according to claim 3, further comprising control means for controlling to reproduce the information recorded in the information recording medium from a specified position based on any one of selected or retrieved position information, or any one of position information selected or retrieved from said additional information or identification information.

12. The information reproducing apparatus according to claim 5, further comprising a controller for controlling to reproduce the information recorded in the information recording medium from a specified position based on any one of selected or retrieved position information, or any one of position information selected or retrieved from said additional information or identification information.

13. The information reproducing apparatus according to claim 6, further comprising a controller for controlling to reproduce the information recorded in the information recording medium from a specified position based on any one of selected or retrieved position information, or any one of position information selected or retrieved from said additional information or identification information.

14. The information reproducing apparatus according to claim 7, further comprising a controller for controlling to reproduce the information recorded in the information recording medium from a specified position based on any one of selected or retrieved position information, or any one of position information selected or retrieved from said additional information or identification information.

* * * * *